US012791864B2

(12) United States Patent
Van Heugten

(10) Patent No.: US 12,791,864 B2
(45) Date of Patent: *Nov. 10, 2026

(54) DYNAMIC FOCUSING HEAD MOUNTED DISPLAY

(71) Applicant: e-Vision Smart Optics, Inc., Sarasota, FL (US)

(72) Inventor: Anthony Van Heugten, Sarasota, FL (US)

(73) Assignee: e-Vision Smart Optics, Inc., Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/028,702

(22) Filed: Jan. 17, 2025

(65) Prior Publication Data

US 2025/0189800 A1 Jun. 12, 2025

Related U.S. Application Data

(63) Continuation of application No. 18/313,450, filed on May 8, 2023, now Pat. No. 12,222,511, which is a (Continued)

(51) Int. Cl.
*G02B 27/01* (2006.01)
*G02B 3/14* (2006.01)
(Continued)

(52) U.S. Cl.
CPC ........... *G02B 27/0172* (2013.01); *G02B 7/04* (2013.01); *G02B 27/16* (2013.01); *G02B 27/40* (2013.01);
(Continued)

(58) Field of Classification Search
CPC ... G02B 3/14; G02B 5/10; G02B 7/04; G02B 26/004; G02B 26/005; G02B 27/0172; G02B 27/16; G02B 27/40
See application file for complete search history.

(56) References Cited

U.S. PATENT DOCUMENTS 5,071,229 A 12/1991 Oaki et al.
6,449,309 B1 9/2002 Tabata
(Continued)

FOREIGN PATENT DOCUMENTS

CN 1071262 A 4/1993
CN 1788226 A 6/2006
(Continued)

OTHER PUBLICATIONS

Chen et al., "A polarized liquid crystal lens with electrically switching mode and optically written mode." Emerging Liquid Crystal Technologies X. vol. 9384. SPIE, 2015, 10 pages.
(Continued)

*Primary Examiner* — Mihir K Rayan
(74) *Attorney, Agent, or Firm* — Smith Baluch LLP

(57) ABSTRACT

A conventional head-mounted display (HMDs) can display a virtual image at a fixed focus (e.g., infinite focus). If the user looks at an object that appears closer than the virtual image, then accommodation by the user's eyes will cause the virtual image to appear blurry. The HMDs disclosed herein include a dynamic electro-active focusing element that changes the focus of the virtual image to account for accommodation by the user. This dynamic electro-active focusing element may include a curved layer of electro-active material, such as nematic or bi-stable (e.g., cholesteric) liquid crystal, disposed between a static concave mirror and a convex surface on a beam splitter or other optical element. Changing the refractive index of the electro-active material causes the focus of the dynamic electro-active focusing element, making it possible to shift the virtual image's focus in as the user's eyes change focus.

19 Claims, 13 Drawing Sheets

Related U.S. Application Data continuation of application No. 17/577,965, filed on Jan. 18, 2022, now Pat. No. 11,668,941, which is a continuation of application No. 17/008,857, filed on Sep. 1, 2020, now Pat. No. 11,237,396, which is a continuation of application No. 15/589,376, filed on May 8, 2017, now Pat. No. 10,782,526, which is a continuation of application No. PCT/US2016/059346, filed on Oct. 28, 2016.

(60) Provisional application No. 62/270,896, filed on Dec. 22, 2015.

(51) Int. Cl.
*G02B 5/10* (2006.01)
*G02B 7/04* (2021.01)
*G02B 26/00* (2006.01)
*G02B 27/16* (2006.01)
*G02B 27/40* (2006.01)

(52) U.S. Cl.
CPC .................. *G02B 3/14* (2013.01); *G02B 5/10* (2013.01); *G02B 26/004* (2013.01); *G02B 26/005* (2013.01); *G02B 2027/0181* (2013.01); *G02B 2027/0185* (2013.01)

(56) References Cited

U.S. PATENT DOCUMENTS 6,619,799 B1 9/2003 Blum et al.
7,411,637 B2 8/2008 Weiss
7,436,598 B2 10/2008 Kuiper et al.
8,154,804 B2 4/2012 McGinn et al.
8,184,068 B1 5/2012 Rhodes et al.
8,363,329 B2 1/2013 Takai et al.
8,854,519 B2 10/2014 Duston et al.
8,873,149 B2 10/2014 Bohn et al.
9,081,208 B2 7/2015 Blum et al.
9,116,337 B1 8/2015 Miao
9,671,612 B2 6/2017 Kress et al.
10,247,946 B2 4/2019 Kress et al.
10,502,876 B2 12/2019 Robbins et al.
10,782,526 B2 * 9/2020 Van Heugten ........... G02B 7/04
11,237,396 B2 * 2/2022 Heugten .................. G02B 7/04
11,668,941 B2 * 6/2023 Heugten ............ G02B 27/0172 345/8
12,222,511 B2 * 2/2025 Heugten ............ G02B 27/0172
2002/0101568 A1 8/2002 Eberl et al.
2003/0231293 A1 12/2003 Blum et al.
2004/0021929 A1 2/2004 Nishioka et al.
2004/0027501 A1 2/2004 Blum et al.
2006/0007056 A1 1/2006 Ou
2006/0044448 A1 3/2006 Kato et al.
2006/0164593 A1 7/2006 Peyghambarian et al.
2006/0232665 A1 10/2006 Schowengerdt et al.
2007/0024981 A1 2/2007 Duncan et al.
2007/0052876 A1 3/2007 Kaufman et al.
2009/0213321 A1 8/2009 Galstian et al.
2009/0279050 A1 11/2009 Mcginn et al.
2010/0149073 A1 6/2010 Chaum et al.
2011/0075257 A1 3/2011 Hua et al.
2012/0026596 A1 2/2012 Berge et al.
2012/0069450 A1 3/2012 Bolis
2012/0262663 A1 * 10/2012 Chin ........................ G02B 3/14 349/200
2013/0033756 A1 2/2013 Spitzer et al.
2013/0113973 A1 * 5/2013 Miao .................... G02B 27/017 348/E5.022
2013/0207887 A1 * 8/2013 Raffle ................ G02B 27/0176 345/156
2013/0314793 A1 11/2013 Robbins et al.
2014/0168266 A1 * 6/2014 Kimura .................. G06F 3/011 345/633
2014/0337773 A1 11/2014 Phang et al.
2014/0347736 A1 11/2014 Liu et al.
2015/0212326 A1 * 7/2015 Kress ................. G02B 27/0172 349/11
2015/0219893 A1 8/2015 Chen et al.
2015/0219899 A1 8/2015 Mack et al.
2015/0234187 A1 8/2015 Lee
2016/0195720 A1 7/2016 Travis et al.
2017/0293146 A1 10/2017 Nicholls et al.
2018/0376562 A1 12/2018 Peng et al.

FOREIGN PATENT DOCUMENTS

CN 101194198 A 6/2008
CN 100595620 C 3/2010
CN 104199196 A 12/2014
EP 2919060 A2 9/2015
GB 2273367 A 6/1994
IN 349MUM2013 11/2014
JP S5029049 A 3/1975
JP H06324284 A 11/1994
JP H08160344 A 6/1996
JP 2000081573 A 3/2000
JP 2001249282 A 9/2001
JP 2002174804 A 6/2002
JP 2002278670 A 9/2002
JP 2002544533 A 12/2002
JP 2005266128 A 9/2005
JP 2006018325 A 1/2006
JP 2006293241 A 10/2006
JP 2008134619 A 6/2008
JP 2008521061 A 6/2008
JP 2008175918 A 7/2008
JP 2009186923 A 8/2009
JP 2010032706 A 2/2010
JP 2010517081 A 5/2010
JP 2014163964 A 9/2014
JP 2014219621 A 11/2014
JP 2015504616 A 2/2015
WO 2006078806 A2 7/2006
WO 2006055893 8/2007
WO 2008091859 A1 7/2008
WO 2013049248 A3 7/2013

OTHER PUBLICATIONS

Chen et al., "Electrically adjustable location of a projected image in augmented reality via a liquid-crystal lens." Optics express 23.22: 28154-28162 (published Oct. 19, 2015).
Chinese Office Action and English Translation Thereof in Chinese Patent Application No. 201680073140.9 dated Feb. 6, 2020, 24 pages.
Continuous Lens (HL8201). Himax Technologies, Inc. 2015. Accessed at https://www.himax.com.tw/en/products/electrically-tunable-focusing-lenses/continuous-lens/. 1 page.
Extended European Search Report in European Patent Application No. 16879586.2, 12 pages, dated Jul. 19, 2019.
International Search Report and Written Opinion dated Jan. 6, 2017 from International Application No. PCT/US2016/059346, 12 pages.
Japanese Office Action and English Translation Thereof in Japanese Patent Application No. 2018-532356 dated Aug. 23, 2021, 41 pages.
Liu et al., "An optical see-through head mounted display with addressable focal planes." 2008 7th IEEE/ACM International Symposium on Mixed and Augmented Reality. IEEE, 10 pages (2008).
Notification of Reexamination with translation in Chinese App. No. 201680073140.9 dated Jan. 31, 2024, 20 pages.
Notification of Refusal with translation in Japanese Appl. No. 2022-141509 mailed Aug. 28, 2023, 9 pages.
Office Action with translation in Korean Application No. 10-2018-7020698 dated Apr. 6, 2023, 21 pages.

* cited by examiner

805a

803a

801a

805c

803c

801c

DYNAMIC FOCUSING HEAD MOUNTED DISPLAY

CROSS-REFERENCE TO RELATED APPLICATIONS

This application is a continuation of U.S. application Ser. No. 18/313,450, which was filed on May 8, 2023, as a continuation of U.S. application Ser. No. 17/577,965, which was filed on Jan. 18, 2022, as a continuation of U.S. application Ser. No. 17/008,857, which was filed on Sep. 1, 2020, as a continuation of U.S. application Ser. No. 15/589,376, which was filed on May 8, 2017, as a bypass continuation of International Application PCT/US2016/059346, which was filed on Oct. 28, 2016, and which claims the priority benefit of U.S. Application No. 62/270,896, which was filed on Dec. 22, 2015. Each of these applications is incorporated herein by reference in its entirety for all purposes.

BACKGROUND

Head mounted displays (HMDs) are devices worn on or about the head for the user to see information. The information seen can be either overlaid upon the images being observed in the real world (sometimes referred to as augmented reality), information presented that excludes the images of the real word (sometimes referred to as virtual reality), or combinations of these (sometimes referred to as virtual/augmented, or mixed reality).

Typically, the information-bearing images presented in today's HMDs are set to a single focus point. The most common focus point is infinity, or "far distance." This allows the user to see the information images in focus simultaneously with distant real-world objects in the case of augmented reality applications and see only the information at a far distance in the case of virtual reality.

When the information-bearing images are presented to the user in the HMD at infinite focus, several problems arise. If the information-bearing images (also called virtual images) are set to far distance focus when using augmented reality, a user may wish to shift their gaze to an object that is nearer, for example, a hand-held item, which then causes the virtual images to appear out of focus. This could happen if the user looks at a hand-held tablet at normal reading distance. If the user's eyes can accommodate, they will change focus to bring the tablet into focus, but since the virtual images are set to far distance focus the virtual image will appear out of focus while the tablet image is in focus. In this case, it would be desirable if the virtual images could be refocused to the same distance as the tablet so that the virtual images and the tablet are in focus simultaneously.

Similar problems occur when displaying an information-bearing image with an HMD to view virtual reality. In order to create a realistic three-dimensional virtual image, the focus point of the virtual image should be varied so that the human eye changes its focus dynamically, thereby convincing the human brain that the image is nearer or farther away. If the information-bearing image remains at far distance focus only, and other means of simulating varying distance are used without varying focus distance, the effect is not as realistic as if the focus distance was also changed. It would be desirable if the virtual images could be refocused to varying distances dynamically to enhance the virtual reality experience.

SUMMARY

Conventional lenses can be used to vary the focus of information-bearing images. But conventional lenses are constructed from glass and plastic, which are relatively heavy. In addition, conventional lenses generally must be moved with electro-mechanical actuators, such as electrical motors, to change focus. Actuators add more weight, bulk, and complexity. They may also consume relatively high amounts of electrical power, which could increase the weight, bulk, and cost of the power source.

An electro-active lens, such as a liquid-crystal lens, disposed between the eye and the image to be observed can also be used to vary the focus of the eye. Because the eye translates up and down as gaze changes, however, the electro-active lens should be much larger than the pupil of the eye. For example, a 6 mm pupil typically requires an optic that is approximately 40 mm wide to provide sufficient coverage in front of the eye to allow the typical gaze angle changes to occur. Because of limitations of optical path difference (OPD) changes that can be achieved with an electro-active lens, the electro-active lens is typically subject to optical compromises, such as layer stacking and phase wrapping, to achieve the required optical power at the desired optical sizes. These optical compromises usually increase power consumption and require higher speed switching, both of which translate to higher size, weight, and cost.

Embodiments of the present technology include a compact, efficient optical system that can work in tandem with an HMD to change the focus of the virtual images. In some implementations, this optical system is light weight, provides sufficient optical power to compensate for the accommodation range across a wide range of the population (e.g., about 1 Diopter to about 15 Diopters), and consumes very little power. It can also be implemented without any moving parts.

For instance, the present technology may be implemented as an HMD apparatus that includes a display, beam splitter in optical communication with the display, concave reflective surface in optical communication with the beam splitter, and a tunable lens disposed between the beam splitter and the concave reflective surface. The concave reflective surface could also be augmented with or replaced by another focusing component, such as a Graded Refractive Index (GRIN) lens or Fresnel structure. In operation, the beam splitter transmits light emitted by the display. (The beam splitter may also transmit ambient light to a wearer of the HMD apparatus). The concave reflective surface receives the light emitted by the display and transmitted by the beam splitter and reflects an image of the display to the wearer via the beam splitter. And the tunable lens varies a focus of the image of the display reflected to the wearer.

In some cases, the display emits light polarized along an axis parallel to an optical axis of the electro-active material, which may include nematic or bi-stable liquid crystal. Because the display emits polarized light, the electro-active material may be implemented as just a single layer of nematic liquid crystal layer instead of the two nematic liquid crystal layers required by conventional devices. This reduces the device's size, weight, power consumption, cost, and complexity.

The beam splitter can define a convex surface, in which case the electro-active material is disposed between the convex surface and the concave reflective surface. The concave reflective surface may form at least a portion of a ground plane in electrical communication with the electro-active material. The HMD apparatus may also include a plurality of electrodes, disposed between the electro-active material and the convex surface, to apply a voltage gradient to the electro-active material so as to vary the variable refractive index of the electro-active material.

In other cases, the tunable lens comprises a liquid lens having a deformable curved membrane disposed in optical communication with the beam splitter. In these cases, the flexible membrane can define the concave reflective surface that changes shape as fluid is pumped into and out of a cavity defined at least in part of by the concave reflective surface.

The head-mounted display apparatus can include a controller, operably coupled to the tunable lens, to actuate the tunable lens in response to an input from the wearer. In addition, the controller can actuate the tunable lens in response to an image on the display.

The present technology may also be implemented as a method of displaying information on an HMD. In one example, the HMD displays an information-bearing image to a wearer of the HMD at a focus selected to match accommodation of the wearer. The HMD may generate the information-bearing image at a display, transmit the information-bearing image through an electro-active material disposed between a beam splitter and a concave reflective surface, and reflect the information-bearing image to the wearer via the concave reflective surface and the beam splitter. The HMD may actuate the electro-active material so as to change the focus of the information-bearing image. In some cases, the HMD actuates the electro-active material in response to a command from the wearer and/or in response to information in the information-bearing image. The HMD may also actuate the electro-active material in response to a signal from an accommodation sensor, which may measure inter-pupillary distance to determine the converging point of gaze of the eyes, sense the wavefront of incident light, measure pupil diameter and light level, etc.

Other embodiments of the present technology include a head-mounted display apparatus comprising a display, a beam splitter in optical communication with the display, a concave reflective surface in optical communication with the beam splitter, and a liquid crystal layer disposed between the convex surface and the concave reflective surface. In operation, the display emits polarized light. The beam splitter transmits a portion of the polarized light emitted by the display. The concave reflective surface receives the portion of the polarized light transmitted by the beam splitter and reflects an image of the display to a wearer of the head-mounted display apparatus via the beam splitter. And the liquid crystal layer varies a focus of the image of the display reflected to the wearer.

Still another embodiment of the present technology includes a head-mounted display apparatus comprising a display, a beam splitter in optical communication with the display, a liquid lens in optical communication with the beam splitter, and a mirror in optical communication with the liquid lens and the beam splitter. In operation, the beam splitter transmits light emitted by the display. The liquid lens provides a variable optical power. And the mirror receives the light emitted by the display and transmitted by the beam splitter via the liquid lens and reflects an image of the display to a wearer of the head-mounted display apparatus via the liquid lens.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

A birdbath with a dynamic focusing element, such as an electro-active lens concave mirror, allows dynamic change of focus of the virtual image for compensating for accommodation or enhancing the illusion of depth. It also provides for the ability to compensate for refractive errors of the user, eliminating the need for the user to wear corrective lenses, such as glasses, between an HMD device and the eye when using the HMD. Such a birdbath system allows the dynamic changing of focus of the virtual image displayed by the HMD with low power consumption and no moving (mechanical) parts.

Applications for inventive HMD devices include, but are not limited to: map guidance while driving without having to look away from the road, performing surgery while being provided vital signs data within the same field of view, utilizing repair and service manuals with virtual instructive diagrams overlaid upon the actual object being repaired or serviced, improving situational awareness of military and law enforcement personnel by allowing additional tactical information being provided to them while simultaneously keeping "eyes on target," and more.

Conventional Birdbaths for Head-Mounted Displays (HMDs)

Figure 1:
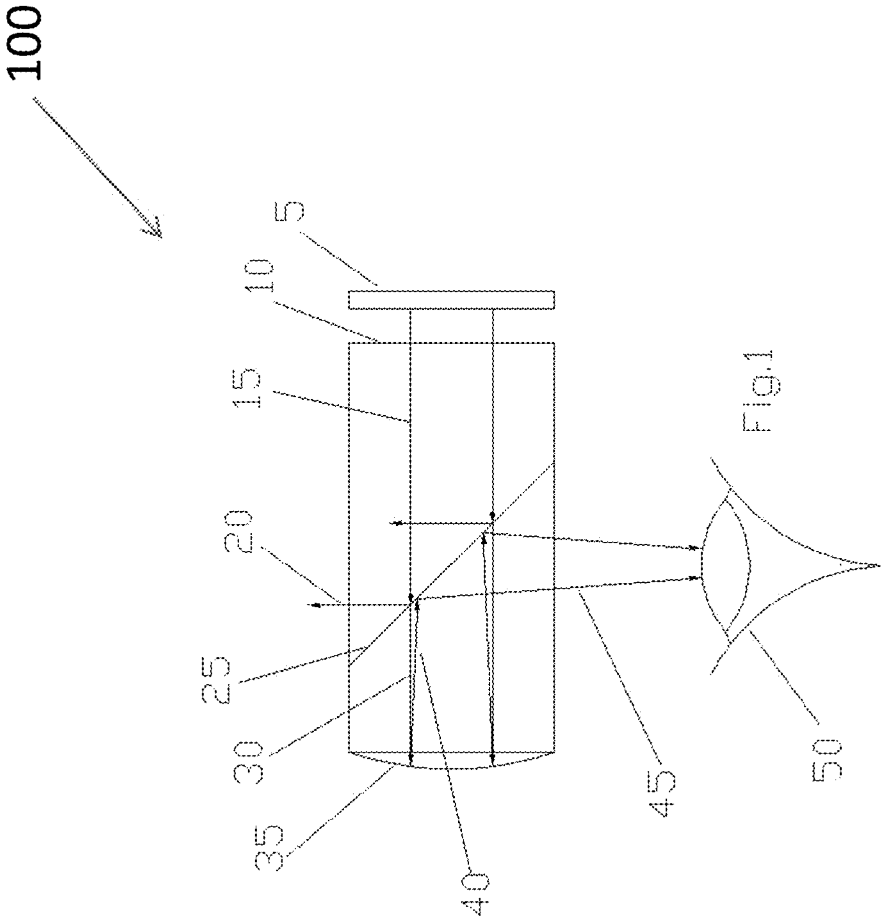
FIG. 1 is a profile view of a conventional birdbath optic for a head-mounted display (HMD).

FIG. 1 shows a conventional "birdbath" optic 100 for use with a head-mounted display (HMD). It includes a mini display or other display source 5, an optic block 10, a beam splitter 25, and a concave mirror 35. An information-bearing image from the mini display or other display source 5 enters into an optic block 10 (in this case it is solid but could be air), and encounters a beam splitter 25. The beam splitter 25 directs a portion of the light away from the eye and allows a portion of the light to continue its journey to a mirror 35. The mirror 35 in this example is a curved concave mirror that reflects an incident light ray 40 at an angle, causing the light ray 40 to converge to a focus. The light ray 40 encounters beam splitter 25 again, which reflects the converging light rays 45 toward the eye 50.

Because the mirror 35 is concave, the wavefront approaching the eye is also concave, or "pre-focused," allowing the optics of the eye (i.e., the cornea and crystalline lens), to focus an image on the retina with the eye fairly close to the device. If the mirror 35 was flat, a corrective optic would be required in front of the eye to assist the eye to bring the image into focus, but the curvature of mirror 35 eliminates the need for a corrective optic. However, the eye should be at a predetermined distance from the device in order for the image to come in to focus without accommodation. Typical predetermined distances are 11-15 mm. At these distances, people feel comfortable with the device in front of their eyes.

Figure 2:
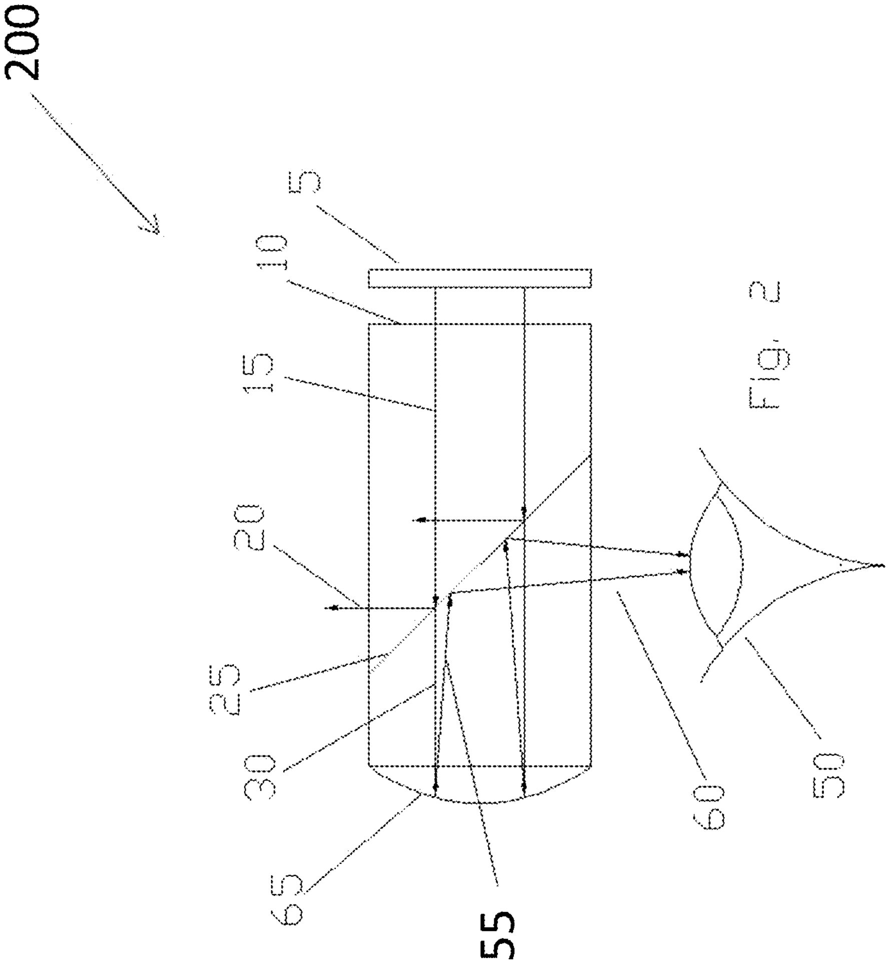
FIG. 2 is a profile view of a conventional birdbath optic for an HMD.

FIG. 2 shows a birdbath optic 200 that is similar to the device 100 in FIG. 1, except that it includes a concave mirror 65 with a shorter radius of curvature than the concave mirror 35 shown in FIG. 1. The mirror's shorter radius of curvature results in the eye 50 having to be closer to the device 200 in order for the image to come into focus without accommodation or corrective optics. That is, FIG. 2 shows that altering the curvature of the concave mirror 35 in a birdbath 200 alters the focus of the virtual images provided by the birdbath 200 by changing the convergence angle of light rays 55 and 60.

Liquid-Crystal Dynamic Focusing Mirror Birdbath for HMD

A dynamic focus birdbath includes a tunable lens, such as an electro-active lens or liquid lens, combined with a mirror and integrated inside of the birdbath system. Placing a lens with an adjustable focal length between the display and concave mirror in the birdbath (e.g., over mirror 35 in FIG. 1 or mirror 65 in FIG. 2) makes it possible to vary the power of the concave mirror and the focus of the virtual image without moving parts. This brings at least the following improvements to the overall system.

First, by combining the mirror with a tunable lens, the focus of the information-bearing image that the user sees through the dynamic focus birdbath optic may be adjusted without affecting the focus of the real world image that the user also sees through the dynamic focus birdbath optic. This can be very helpful for people with accommodation remaining in their eyes.

Second, because the tunable lens works with the mirror such that the light passes through the lens on the way toward the mirror, and then again after it has been reflected, the lens retards the light twice, effectively doubling the its optical power range. This reduces power consumption, device complexity, and light scattering.

Third, when implemented as a liquid crystal optic combined with a concave mirror inside of the birdbath optic and used with a display engine that emits a polarized output, only a single layer of nematic liquid crystal or other polarization sensitive material is needed, reducing complexity, cost, power consumption, and light loss. Conversely, if the dynamic compensating liquid crystal optics were arranged in a single-pass geometry, each compensating element might require two layers of liquid crystal (one for each polarization state) because the incident ambient light is not necessarily polarized. A device with two separate compensating lenses has up to four liquid crystal layers, with each compensating lens having two orthogonally aligned layers of nematic liquid crystal. Each compensating lens has two orthogonally aligned liquid crystal layers because nematic liquid crystal can alter one polarization state at a time. To act on unpolarized light, a beam splitter or pair of polarizers in the compensating lens resolves the unpolarized light into orthogonal polarization states that can be modulated by the nematic liquid crystal layers. This ensures both that light in both polarization states is altered simultaneously. In contrast, a birdbath optic with an electro-active concave mirror could be implemented with a single liquid crystal layer that focuses polarized light coming from the display engine and is not required to focus unpolarized light coming from the real world.

Figure 3A:
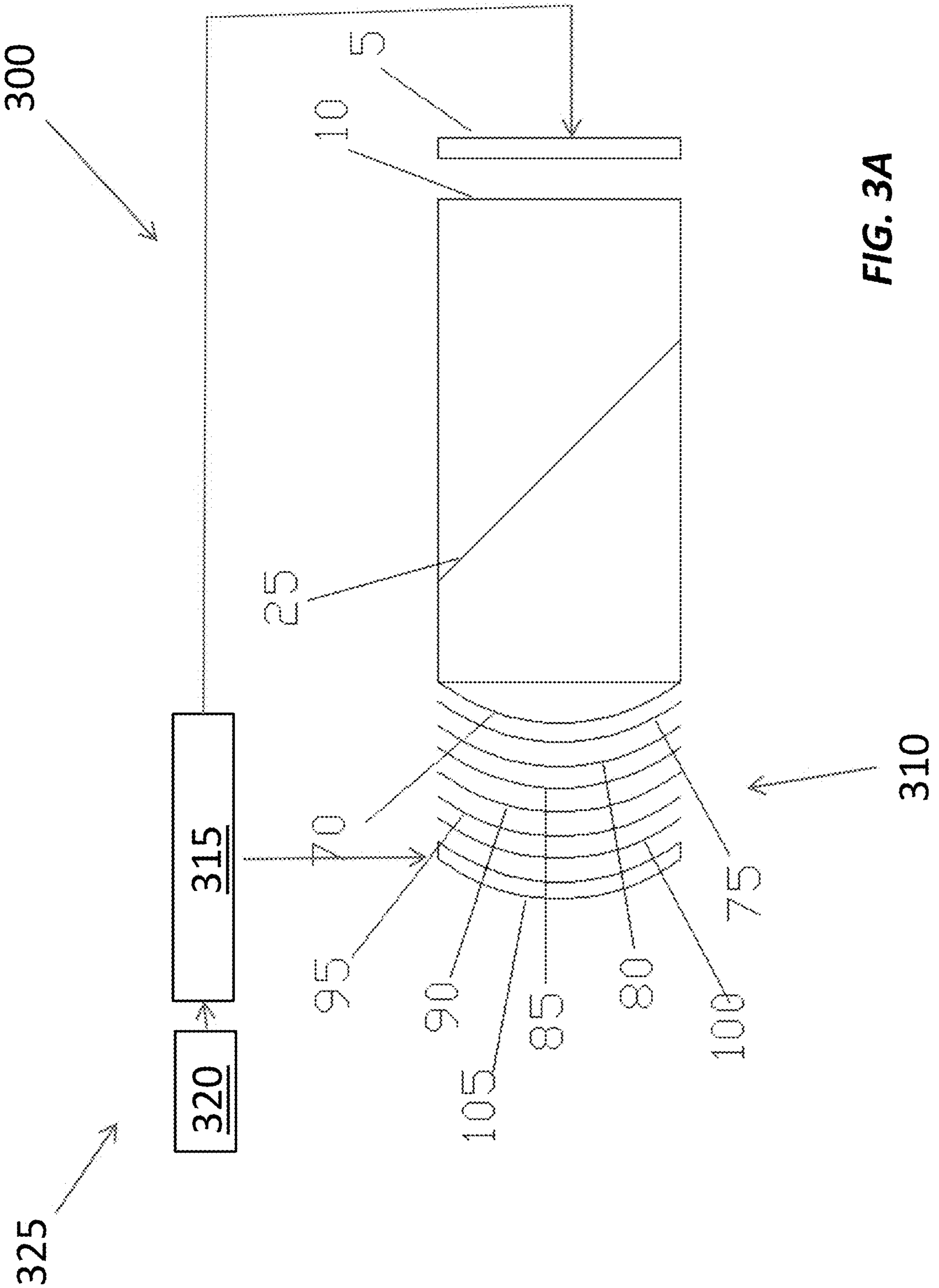
FIG. 3A is an exploded view of a variable-focus birdbath optic with a curved electro-active focusing element.

FIG. 3A shows in cross section an exemplary construction of a variable-focus birdbath optic 300 with a liquid crystal based, dynamically adjustable concave mirror 310. Like the birdbaths shown in FIGS. 1 and 2, the birdbath optic 300 in FIG. 3A includes a display 5 and an optic block 10 that defines a beam splitter 25 and a transparent convex surface 70. Unlike the conventional birdbath optics, however, the birdbath optic 300 includes several layers sandwiched between the transparent convex surface 70 and a concave reflective layer 100. Together, these layers form the liquid crystal based, dynamically adjustable concave mirror 310.

As shown in FIG. 3A, the transparent convex surface 70 is coated with a layer 75 of (substantially) transparent electrically conductive material, such as a 40 nm thick layer of indium tin oxide (ITO). Layer 80 is an alignment layer, such as rubbed polyimide. Layer 85 is a layer of liquid crystal material, for example, a 15-micron thick layer of Merck MLC-2140. Layer 90 is another alignment layer, which could also be rubbed polyimide.

Layer 95 includes electrically conductive and insulating materials patterned to form electrodes for actuating the liquid crystal material. For example, layer 95 may be patterned into a series of concentric conductive rings, e.g., as described in greater detail below with respect to FIGS. 4-6. Layer 95 could also include electrodes patterned in different shapes, including orthogonally positioned and stacked linear electrodes that individually produce cylinder optical power and in combination produce spherical power. Layer 95 could also be patterned to form individually addressable pixelated areas (pixels), each of which acts individually to produce piston-only retardation. These pixels can be actuated collectively to produce spherical, cylindrical, or arbitrary wavefront shapes.

The concave reflective layer 100 forms a reflective surface and can be made of or include aluminum or another suitable reflective material. Surface 105 is an end cap that traps layers 75 through 100 between surfaces 105 and 70. At the periphery of each of the layers described above is a sealing material (not shown), such as Norland 65 or another adhesive, to prevent the liquid crystal from escaping or leaking out.

Each layer sandwiched between the transparent convex surface 70 and the concave reflective layer 100 can have a uniform thickness or a thickness that varies with distance from the optical axis of the liquid crystal based, dynamically adjustable concave mirror 310. In other words, the transparent convex surface 70 and the concave reflective layer 100 can have the same radius of curvature or different radii of curvature. In a dynamically adjustable concave mirror 310 with a single electrode configured for a positive optical power, for example, the liquid crystal layer 85 may be thicker at the center of the dynamically adjustable concave mirror 310 and thinner at the edges of the dynamically adjustable concave mirror 310. The liquid crystal layer 85 may include nematic, cholesteric, or other bi-stable liquid crystal material. In this case, the concave reflective layer 100 has a smaller radius of curvature than the transparent convex surface 70. For a lens with negative optical power the reverse would be the case, i.e., the liquid crystal layer 85 is thinner in the center and thicker at the edges.

In a dynamically adjustable concave mirror 310 with multiple electrodes, the liquid crystal layer 85 may be thicker at the center of the dynamically adjustable concave mirror 310 and thinner at the edges of the dynamically adjustable concave mirror 310 to bias the optical power to having more plus power. For example, instead of being capable of adjusting from zero to 3 Diopters in infinite steps, it may then be designed to adjust from zero to one diopter in one discrete jump, then adjust from 1 to 4 Diopters in infinite steps. In this case, the concave reflective layer 100 has a smaller radius of curvature than the transparent convex surface 70. Reversal of this configuration, i.e., with an electro-active element that is thinner in the center than the edges, would bias the lens toward having more negative optical power.

The radii of curvature of the concave reflective layer 100 and the transparent convex surface 70 also depend on the desired focal length of the dynamically adjustable concave mirror 310. As well understood in the art of optics, the focal length of a concave mirror is given by:

$$\frac{1}{s_0} + \frac{1}{s_1} = \frac{2}{R} = \frac{1}{f}$$

where $s_0$ is the object distance from the mirror, $s_1$ is the image distance from the mirror, R is the mirror's radius of curvature, and f is the mirror's focal length. Generally speaking, the radii of curvature of the concave reflective layer 100 and the transparent convex surface 70 may be selected according to this formula such that the object distance can be anywhere from 2 mm to infinity and the image distance can be anywhere from 2 mm to infinity. When adding a dynamic liquid crystal lens to a curved mirror, the curved mirror's new, adjusted focal length can be calculated by adding or subtracting to the resultant focal length the influence of the liquid crystal's effect upon the light rays travel toward and away from the mirror. For example, if the fixed mirror produces 10 Diopters of optical power (i.e., a focal length of 100 mm), and the liquid crystal lens adds two Diopters of plus optical power (i.e., a focal length of 500 mm), the new focal length is 12 Diopters (i.e., a focal length of 83.3 mm).

Figure 3B:
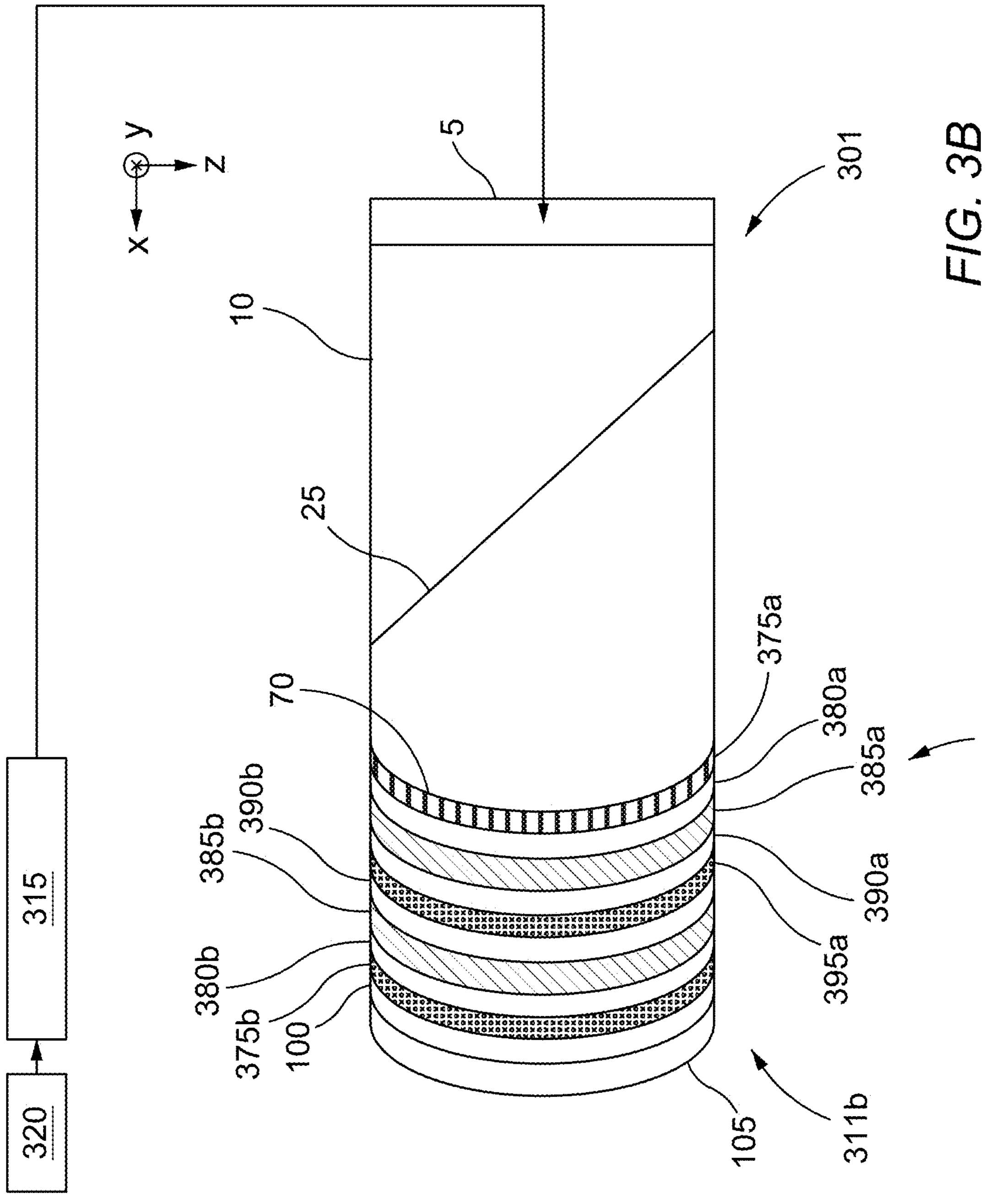
FIG. 3B is a cross-sectional view of a variable-focus birdbath optic with a pair of crossed electro-active, cylindrical lenses.

FIG. 3B shows a birdbath optic 301 a pair of crossed liquid crystal lenses 311*a* and 311*b* (collectively, liquid crystal lenses 311) that provide variable cylindrical power along orthogonal axes. Each liquid crystal lens 311 includes a corresponding liquid crystal layer 385*a*/385*b* sandwiched between a corresponding pair of alignment layers 380*a*/380*b* and 390*a*/390*b*. And each liquid crystal layer 385*a*/385*b* may include nematic liquid crystal material or cholesteric or other bi-stable liquid crystal material. A common ground plane 395 is disposed between the alignments layers 390*a*/390*b*. Each liquid crystal lens 311 also includes a set of linear electrodes 375*a*/37*b*. As shown in FIG. 3B, these sets of linear electrodes 375*a*/375*b* are crossed. In this example, linear electrodes 375*a* are arrayed parallel to the y axis and linear electrodes 375*b* are arrayed parallel to the z axis. Generally, the linear electrodes can be arrayed in any pair of orthogonal directions in a plane perpendicular to the birdbath optic's optical axis (the x axis in FIG. 3B).

Together, the crossed, dynamically adjustable lenses 311 provide cylindrical optical powers that can be adjusted independently by applying an appropriate waveform to the electrodes. The optical powers may be chosen to produce a net spherical optical power or to produce a desired amount of astigmatism, e.g., to compensate for astigmatism in the user's eye or elsewhere in the optical train.

Those of skill in the art will readily appreciate that the birdbath optic 300 can include more or fewer components. For example, the liquid crystal based, dynamically adjustable concave mirror 310 may include more or fewer layers, including an additional layers of liquid crystal and electrodes. The layers may also be arranged in different orders. And the entrance and exit windows of birdbath optic 300 may be coated with polarizing filters to reduce glare, anti-reflection coatings, and/or scratch coatings.

Those of skill in the art will also appreciate that the variable optical power provided by the electro-active lenses shown in FIGS. 3A and 3B can be provided instead or in addition by other types of devices. For instance, an electro-active lens may include a reflective Fresnel lens, e.g., as disclosed in U.S. Pat. No. 9,329,309, which is incorporated herein by reference in its entirety. Likewise, the liquid crystal portion of each electro-active lens may be implemented as s graded-index (GRIN) liquid crystal lens, diffractive liquid crystal lens, liquid crystal lens with floating electrodes, variable liquid crystal thickness lens, varied alignment layer strength liquid crystal lens, varied polymer network density liquid crystal lens, or varied photoalignment exposure liquid crystal lens. If implemented as a GRIN lens, the electro-active lens may have powering electrodes variably spaced away from the liquid crystal, a high dielectric constant insulation layer and hole patterned electrodes, a thick insulation layer and hole patterned electrodes, a high resistance conductive layer, or hole and ring-based electrodes. The electro-active lens may also be implemented as a blue phase polarization insensitive lens, a dark conglomerate phase polarization insensitive lens, a twisted nematic (TN) liquid crystal transmission-based Fresnel zone plate, or a spatial light modulator (SLM) adaptive optics system.

Control of a Dynamically Adjustable Concave Mirror

Figure 3C:
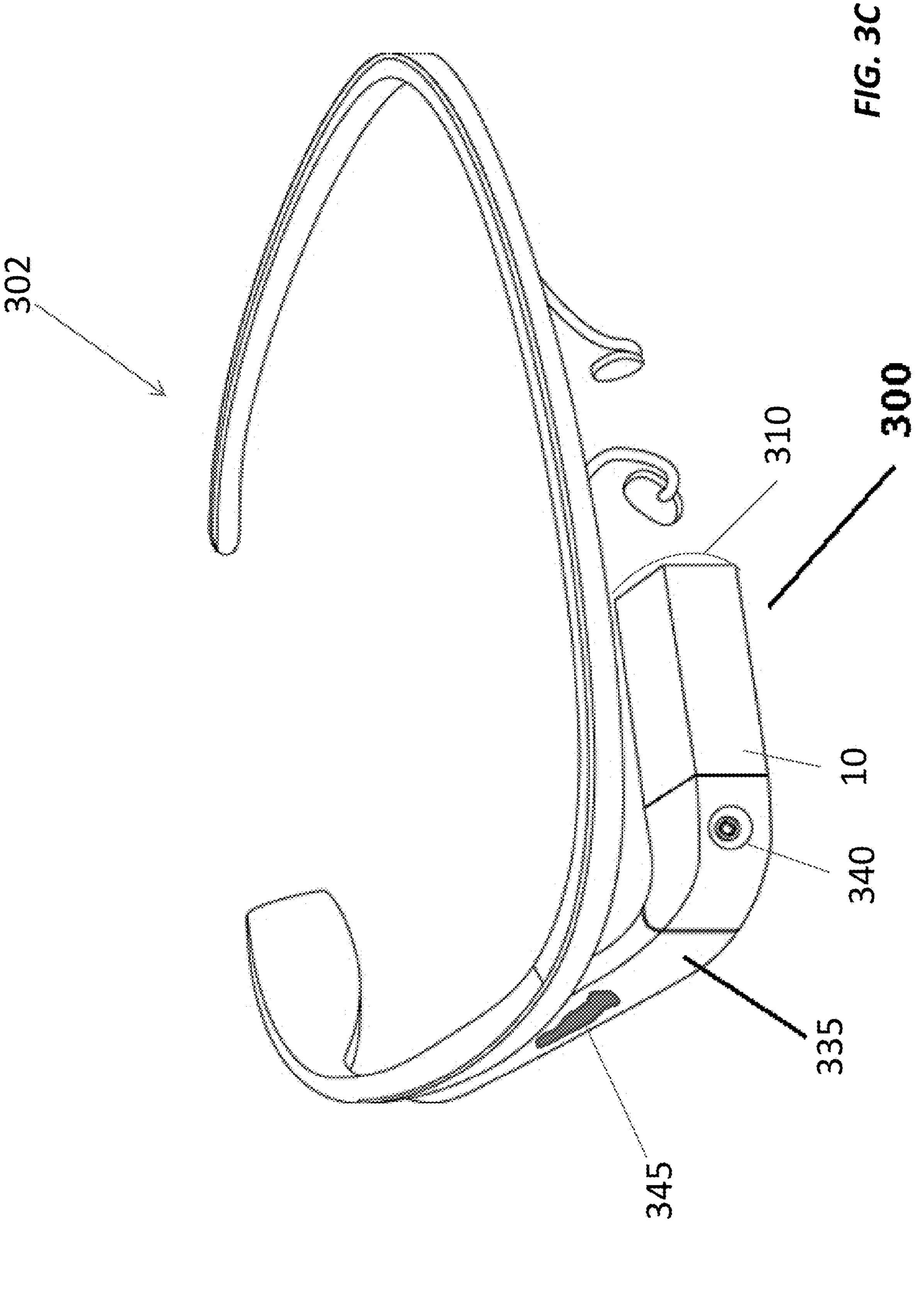
FIG. 3C is a perspective view of an HMD with the variable-focus birdbath optic shown in FIG. 3A.

The birdbath optic 300 shown in FIG. 3A also includes other elements absent from conventional birdbath displays, namely, an electronics assembly 325 with a controller 315 and an optional antenna 320. This electronic assembly 325 may be mounted inside a housing 335, shown as part of an HMD 302 in FIG. 3C, that can also contain the display source 5 as well as a power supply and any other electronics. For instance, the housing 335 may also hold a sensor 340 that detects ambient light levels, movement, range, or any other parameter that can be used to actuate the birdbath optic 300 and/or the display source 5.

In operation, the controller 315 controls the focus of the information-bearing image (virtual image) by varying the voltage applied to the liquid crystal layer 85 via the electrodes (described below with respect to FIGS. 4-6). The variation can be binary (e.g., near or far), stepped through a range of positions (e.g., infinite focus, focus at 2 meters, focus at 1 meter, focus at 50 cm, focus at 25 cm, etc.), or continuously variable over a particular range (e.g., infinite focus to 25 cm) depending on the electrodes, controller 315, and user interface for controlling the focus.

In some cases, the controller 315 changes the focus of the information-bearing image in response to a signal received by the antenna 320, e.g., from a separate device used by the wearer to control the birdbath optic 300. For instance, the wearer may transmit a wireless control signal (e.g., a Bluetooth or Wifi signal) to the controller 315 from a smart phone, smart watch, fob-style controller, or other suitable device.

The wearer may also adjust the focus of the information-bearing image by pressing a button or swiping an area 345 on the temple or frame of the head-mounted display 302 to which the birdbath optic 300 is attached. Touching the button once or swiping the area 345 in a first direction may bring the focus closer, and touching the button twice or swiping the area in a second direction may move the focus farther away.

The controller 315 may also vary the focus of the information-bearing image based on the information-bearing image itself. In these cases, the controller 315 may also be operably coupled to and control the display 5 and/or be operably coupled to and receive control signals from a processor (not shown) that controls the display 5. If the display 5 shows information intended to be seen at near focus, such as information about products on the shelf in the grocery store, the controller 315 may automatically cause the information-bearing image to appear at near focus. Similarly, if the display 5 shows information intended to be seen at infinite focus, such as information about the next exit on a highway, the controller 315 may automatically cause the information-bearing image to appear at infinite focus. Note that the wearer may indirectly control the focus of the information-bearing image by viewing different types of information via the birdbath optic 300.

The controller 315 may also respond to anatomical triggering. For instance, it may sense accommodation based on signals from photodetectors (e.g., sensor 340 in FIG. 3C) that sense ambient light level levels and/or pupil diameter. It may also sense the position or orientation of the wearer's head based on signals from an accelerometer and/or a gyroscope. If the controller 315 senses that the wearer is looking down based on the accelerometer and/or gyroscope signals, it may bring the information-bearing image to near focus. And if the controller 315 senses that the wearer is looking up based on the accelerometer and/or gyroscope signals, it may bring the information-bearing image to infinite focus. The controller 315 may also be configured to vary the focus of the information-bearing image based on electrical detection of nervous impulses or brain waves.

Electrodes for a Dynamically Adjustable Concave Mirror

Figure 4:
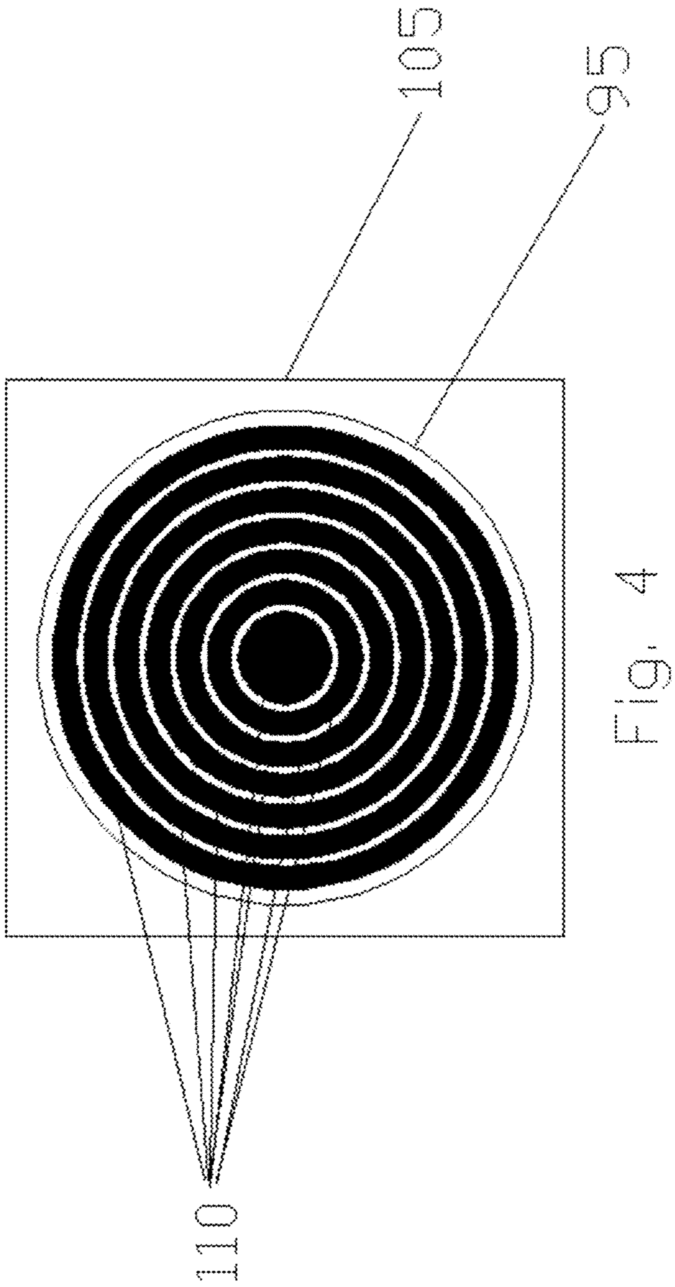
FIG. 4 shows a layer of conductive and insulating material patterned to form concentric ring-shaped electrodes for actuating the curved electro-active focusing element shown in FIG. 3A.
Figure 5:
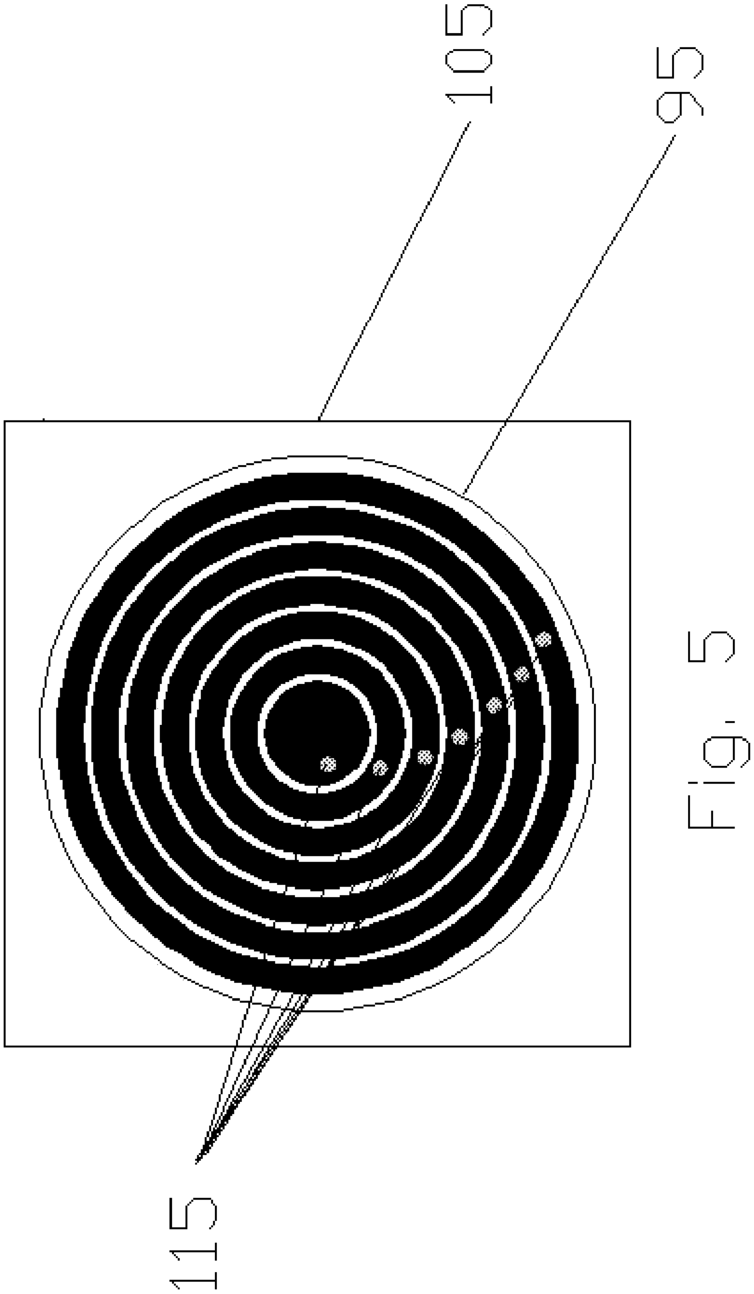
FIG. 5 shows another view of the layer of conductive and insulating material shown in FIG. 4.

FIGS. 4 and 5 illustrate the electrode layer 95 in greater detail. FIG. 4 shows an end-on view of layer 95 as it may be positioned upon reflective layer 100, which is positioned upon end cap 105. The point of view illustrated in FIG. 4 is that of looking at the end cap into its concave surface. Comprising part of the electrode layer 95, a series of concentric electrodes 110 made from an electrically conductive but optically transparent material are patterned onto layer 100. On top of the electrodes 110 is an electrically insulating layer (not shown) that covers the electrodes and the gaps between them. Holes 115 patterned into the insulating layer expose a small area of each of the electrodes 110 as shown in FIG. 5. The insulating layer can be silicon dioxide, which is typically 240 nm thick, or any other electrically insulating, substantially transparent material that can be processed using electronics lithography.

Figure 6:
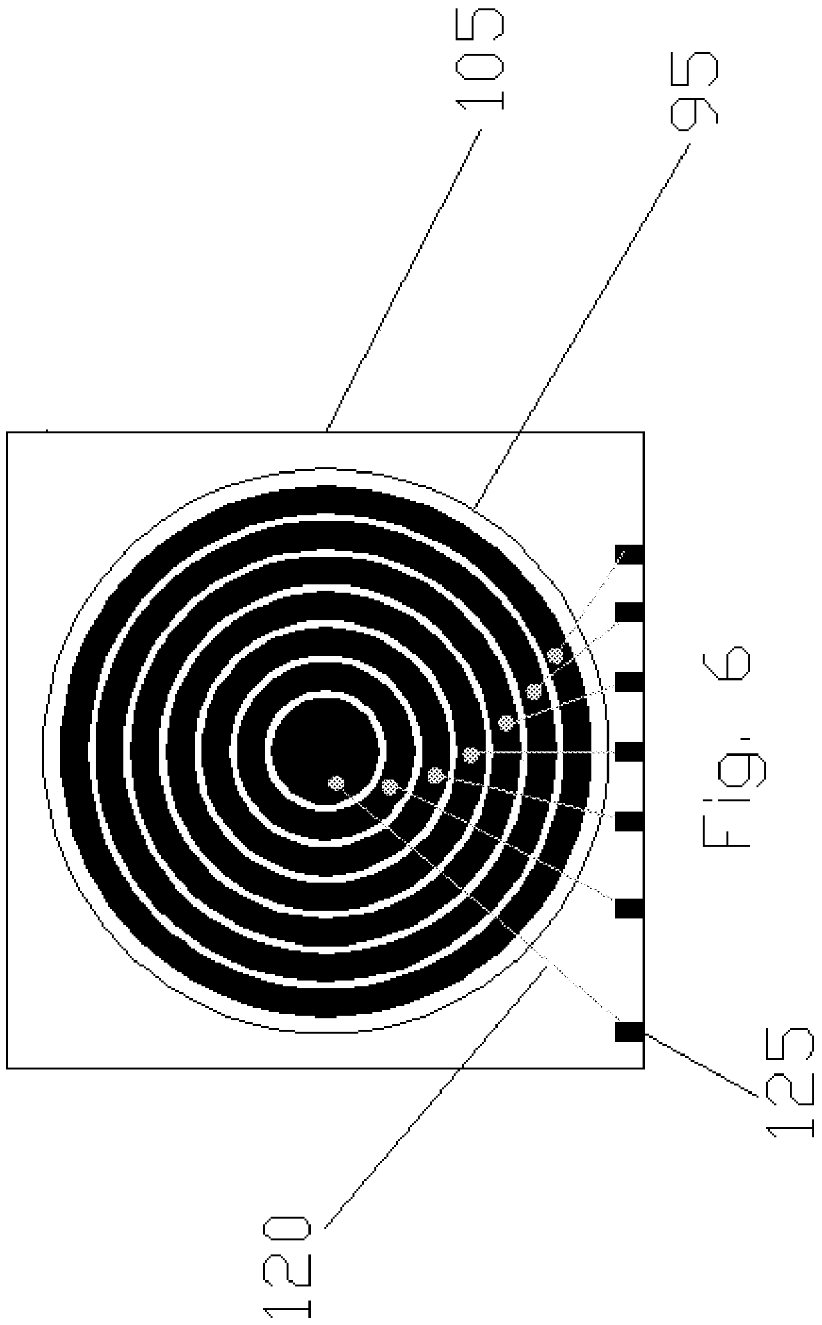
FIG. 6 shows electrical connections between pads and electrodes in the curved electro-active focusing element shown in FIG. 3A.

FIG. 6 shows a series of seven bus lines 120 connecting seven holes 115 (labeled in FIG. 5) to seven electrical connection pads 125. With this configuration, electrical power can be applied to each pad 125, and the current flows to the corresponding electrode 110 without short circuiting as the bus line 120 passes over top of the other electrodes 110. The bus lines 120 and pads 125 can be formed from nickel or another suitable conductive material, e.g., sputtered to a thickness of about 120 nm.

To change the focus of the electro-active concave mirror, a voltage potential is applied to each of the electrodes in a gradient fashion, with the opposite side of the circuit connected to the ground plane (layer 75). An exemplary voltage profile may be 0.6, 0.7, 0.8, 0.95, 1.2, 1.55 and 1.9 volts, from the center to the outside electrode respectively. This voltage profile adds optical power to the reflective surface. Reversing the sequence of the voltages (for example, 1.9, 1.55, 1.2 0.95, 0.8, 0.7 and 0.6 volts, from the center to the outside electrode, respectively) reduces the total optical power of the lens. This allows the user to make the virtual image appear closer (using positive optical power) or farther away (using negative optical power).

In this exemplary embodiment, the patterned electrodes are at layer 95 and the ground plane is layer 75. However, by reversing the two such that the ground plane is at layer 95, layer 95 may be combined with reflective layer 100 and serve as both the optically reflective surface and the electrical ground plane, reducing complexity and cost.

In this exemplary embodiment, there are seven electrodes. Depending on the design, using more electrodes may produce a higher quality optical result. For example, a typical, high quality design may utilize one hundred or more electrodes in a lens with a diameter of 10 mm across. Likewise, FIGS. 4-6 show circular electrodes, but other shapes could be used, including linear electrodes configured to produce two cylinder lenses placed orthogonal to each other to provide spherical optical power with variable astigmatism.

The dynamically adjustable concave mirror 310 illustrated in FIGS. 3-6 includes multiple electrodes that can create a gradient in the index of refraction of a liquid crystal layer. This gradient focuses light incident on the liquid crystal layer. Those of ordinary skill in the art will readily appreciate that other techniques can be used to vary the optical power of a concave mirror. For instance, a dynamically adjustable concave mirror may include a layer of electro-optic polymer or crystal whose refractive index changes in response to an applied stress, strain, or electromagnetic field.

Liquid-Lens Dynamic Focusing Mirror Birdbath for HMD

Alternatively, the reflective surface may be formed on a flexible membrane that, together with the convex surface of the birdbath, defines a sealed cavity. Pumping index-matching fluid into the sealed cavity causes the membrane to bulge, changing the focal length of the dynamically adjustable concave mirror. Withdrawing the fluid from the cavity relieves the bulge, returning the focal length to its original value. The flexible membrane can also be actuated electrostatically, piezo-mechanically, thermally, or using any other suitable technique.

Figure 7A:
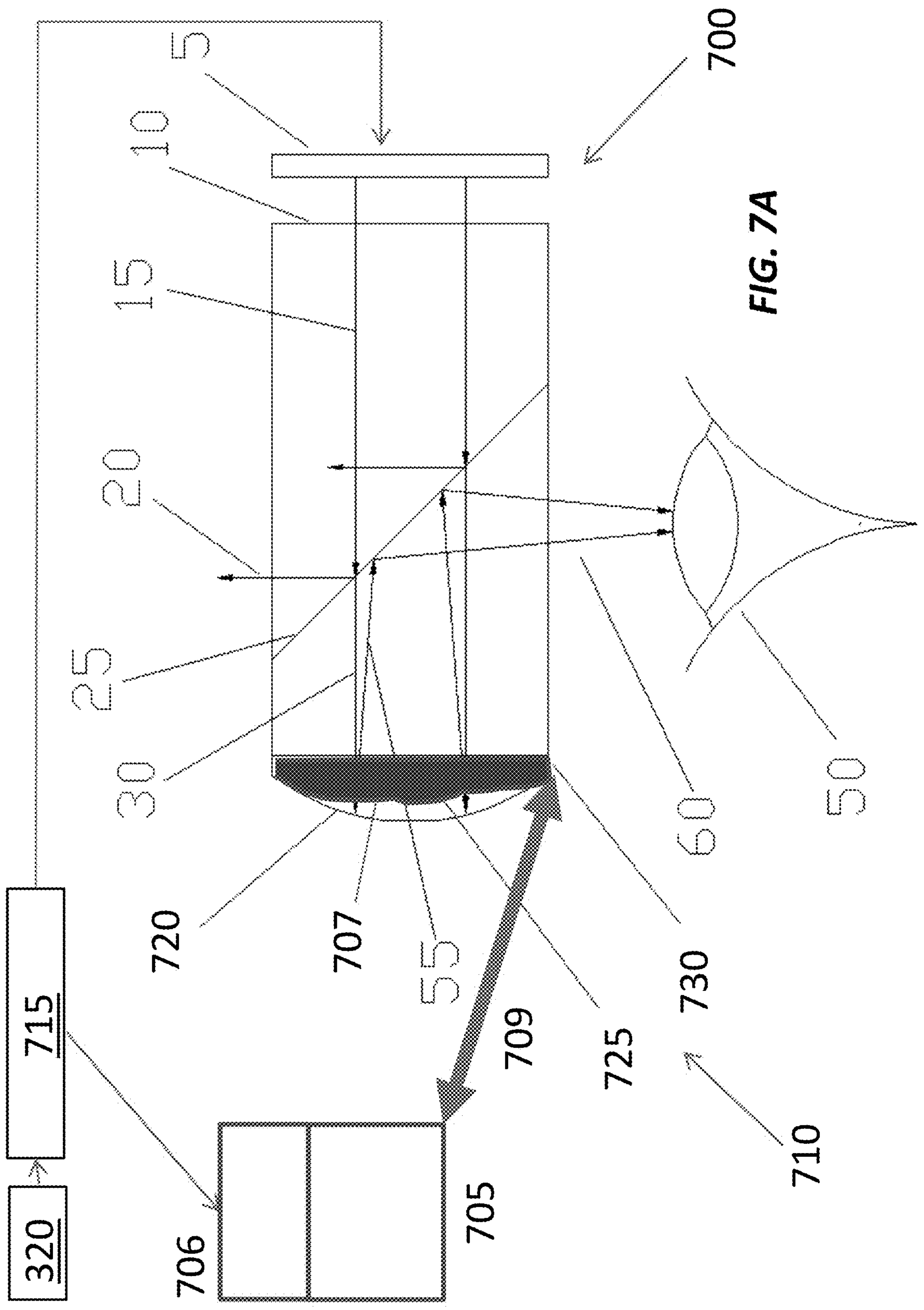
FIGS. 7A and 7B show a membrane-based dynamic focusing birdbath optic.
Figure 7B:
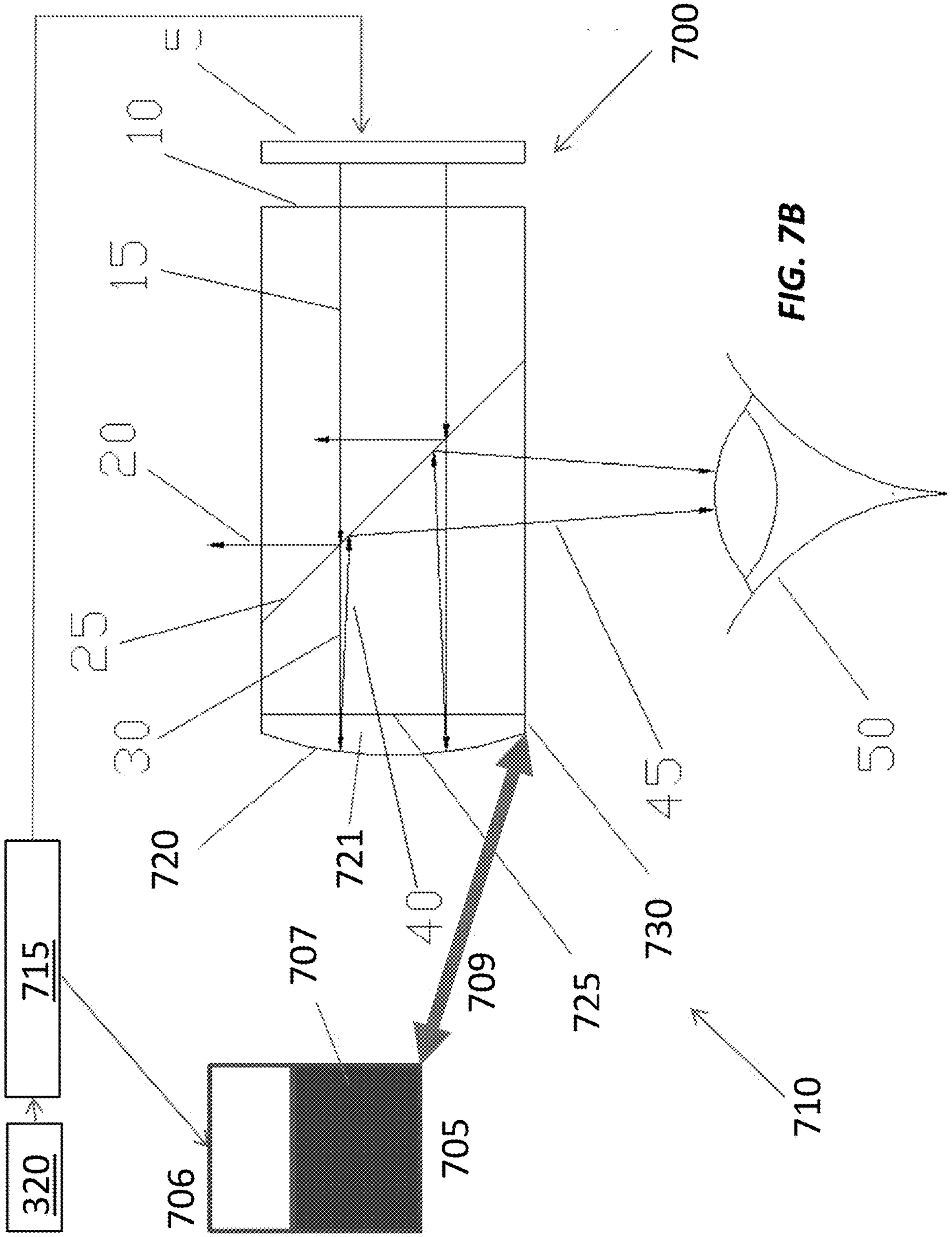

FIGS. 7A and 7B illustrate a birdbath 700 with a membrane-based dynamic focusing mirror 710. The membrane-based dynamic focusing mirror 710 includes a deformable curved membrane 720 disposed opposite a transparent, rigid wall 725. The curved membrane 720 is reflective or coated in a reflective coating to reflect incident light towards the transparent, rigid wall 725. Together, the curved membrane 720 and the transparent, rigid wall 725 define a cavity 721 that is in fluid communication with a fluid reservoir 705 via an aperture 730 and a fluidic channel 709. The membrane-based dynamic focusing mirror 710 also includes a pump 706 that is coupled to the fluid reservoir 705 (and could alternatively be coupled to another portion of the fluid path). And the birdbath 700 includes a controller 715 that controls the pump 706.

In operation, the controller 715 actuates the pump 706 in response to signals from the antenna 320, sensor 340, switch (e.g., user-activated area) 345, etc. The pump 706 responds to the actuation signal from the controller 715 by pumping transparent fluid 707 between the fluid reservoir 705 and the cavity 721. For example, the pump 706 may force fluid 707 into the cavity 721, thereby causing the curved membrane 720 to move away from the transparent, rigid wall 725 as shown in FIG. 7A. This reduces the focusing mirror's radius of curvature and increases its optical power. Similarly, the pump 706 may also force fluid 707 out of the cavity 721, thereby causing the curved membrane 720 to move towards from the transparent, rigid wall 725 as shown in FIG. 7B. This increases the focusing mirror's radius of curvature and decreases its optical power. The exact change in optical power depends on the amount and pressure of the fluid in the cavity 721 and can be controlled in a continuous (analog) or stepped (digital) fashion by the controller 715.

Those of skill in the art will readily appreciate that a birdbath optic that can focus to compensate for accommodation can be implemented with many types of liquid-based lenses in addition to the pump-based fluidic shown in FIGS. 7A and 7B. For instance, it can be implemented with an electro-wetting lens that uses oil, saline, and/or other fluids to provide a variable optical power. And it can be implemented with an electronically controlled shape distorting capsule lens.

Viewing Virtual Images Through a Dynamically Adjustable Concave Mirror

Figure 8A:
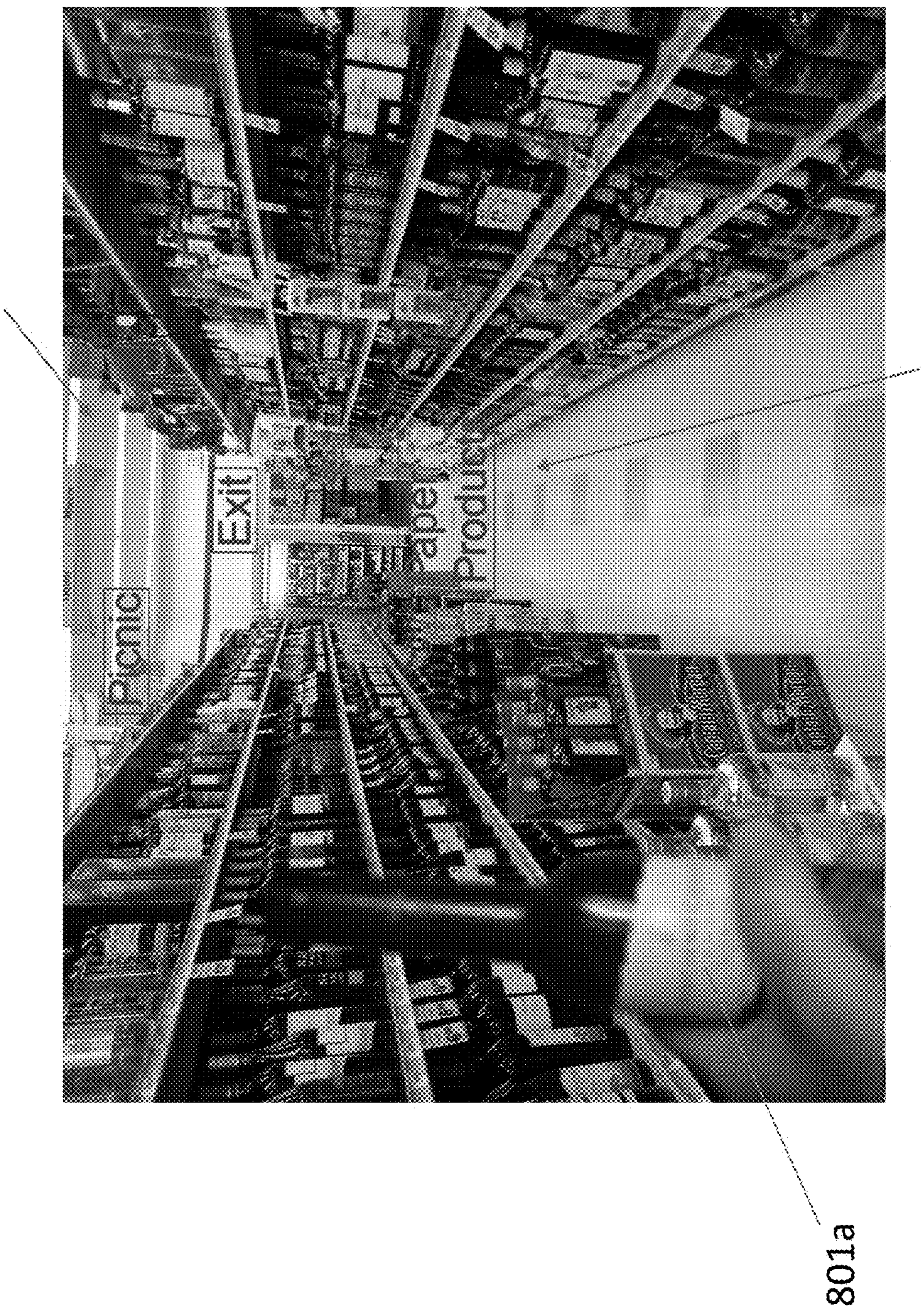
FIG. 8A shows a view through an HMD with a variable-focus birdbath optic with the wearer's focus on a far object and a virtual image set to infinite focus.
Figure 8B:
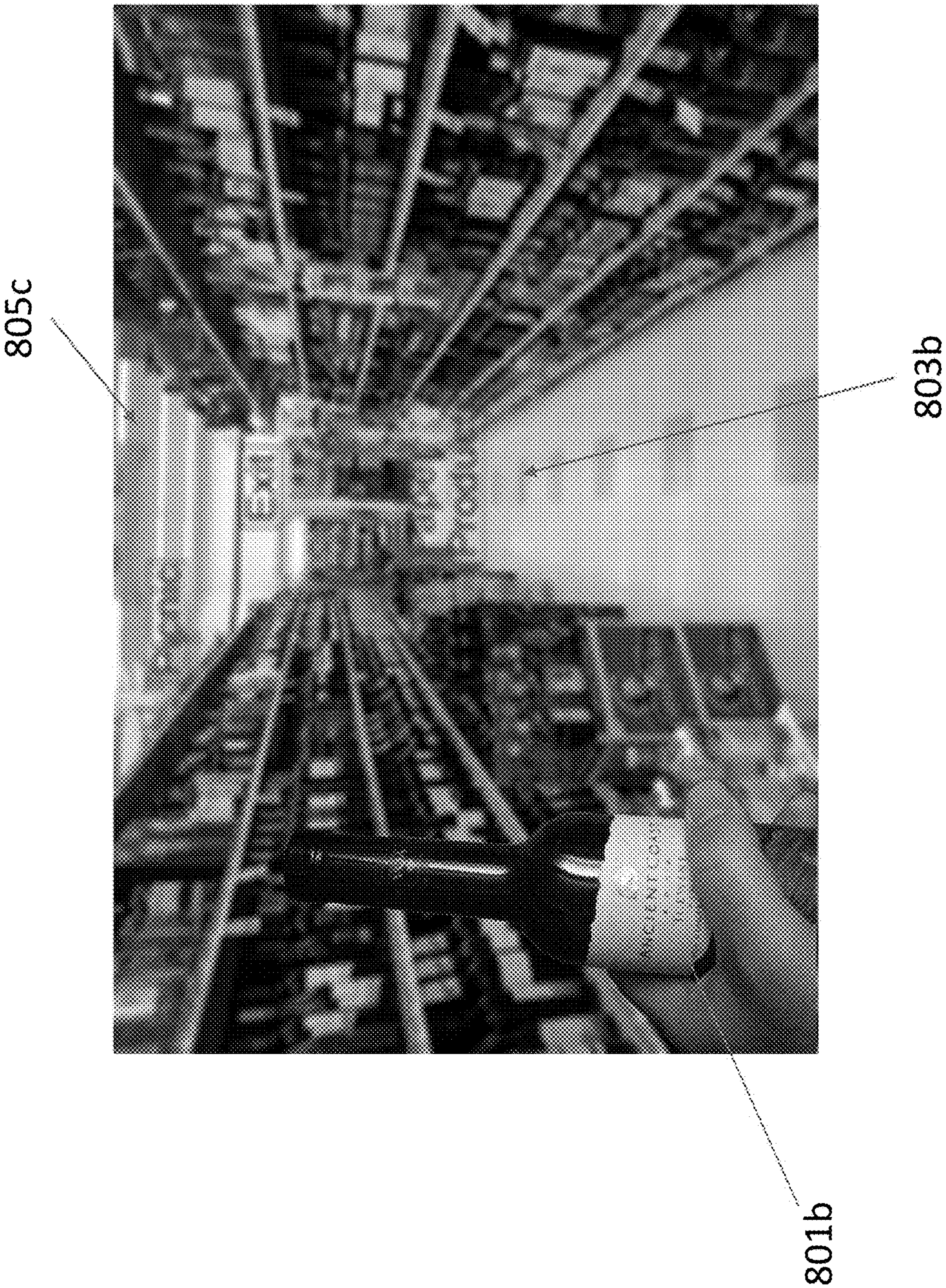
FIG. 8B shows a view through an HMD with a variable-focus birdbath optic with the wearer's focus on a near object and the virtual image set to infinite focus.
Figure 8C:
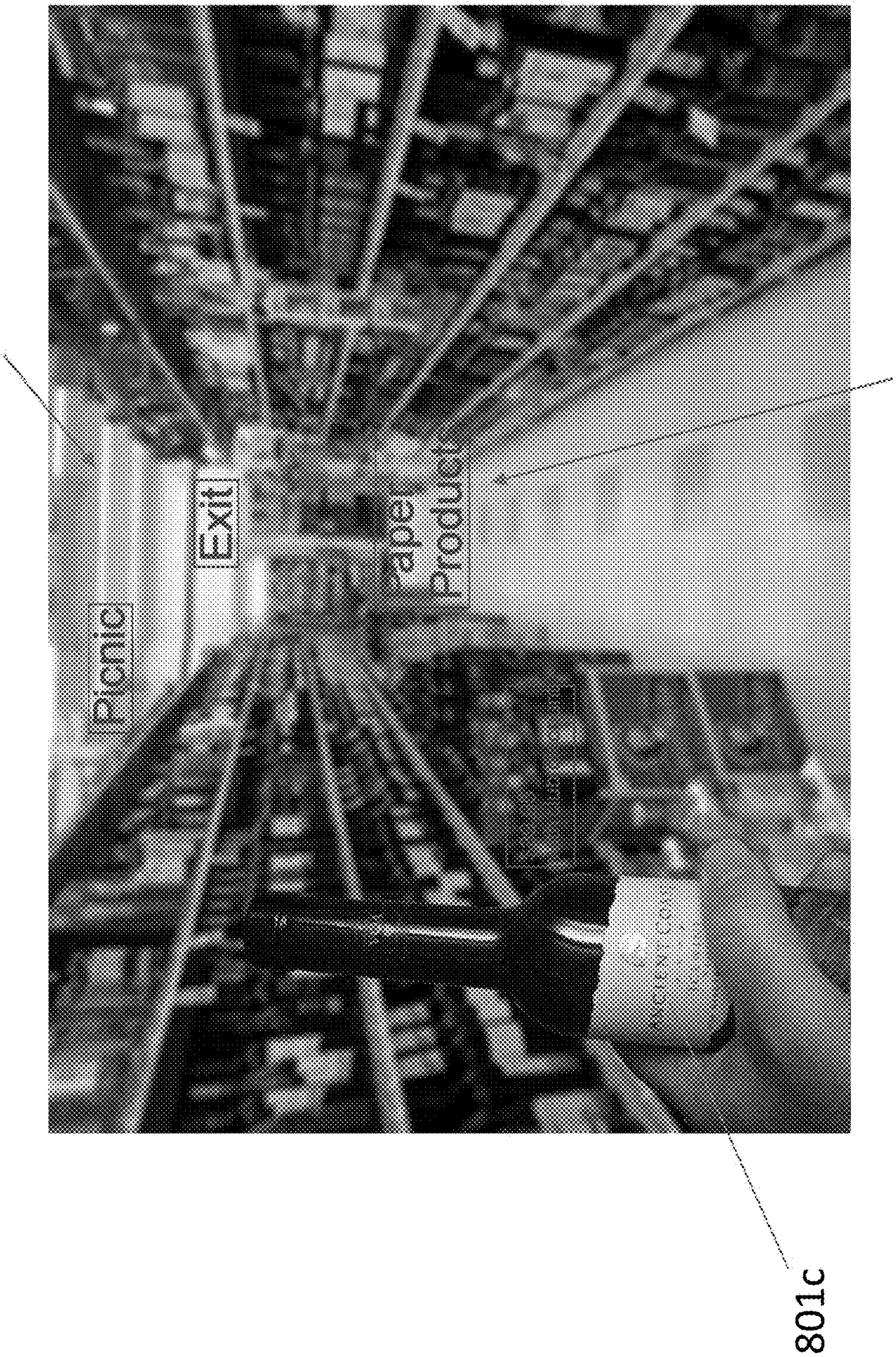
FIG. 8C shows a view through an HMD with a variable-focus birdbath optic with the wearer's focus on a near object and the focus of the virtual image matched to the user's accommodation.

FIGS. 8A-8C illustrate real and virtual images as seen, by a wearer whose eyes accommodate, through a head-mounted display with a birdbath optic that includes a dynamically adjustable concave mirror like those shown in FIGS. 3A, 7A, and 7B. FIG. 8A shows a view of what the wearer sees when looking through the birdbath optic at objects 805*a* at or near infinite focus. The objects 805*a* at infinite focus appear sharply in focus, whereas closer objects, such as the wine bottle 801*a* at bottom left, appear blurry or fuzzy. Because the wearer's eyes are focused on the far objects 805*a*, the dynamically adjustable concave mirror is set to produce virtual images 803*a* (here, object labels) at infinite focus that also appear sharply in focus.

FIG. 8B shows a view of what the wearer sees when looking through the birdbath optic at near objects without a change in the focus of the virtual images. In this case, the wine bottle 801*b* and other objects in the foreground appear sharply in focus, whereas objects 805*b* in the background appear blurry or out of focus. Because the wearer's eyes accommodate, any information-bearing images 803*b* at infinite focus also appear blurry or out of focus. (As mentioned above, a conventional birdbath optics cannot account for accommodation, so the information-bearing images that it displays may appear out of focus to a wearer whose focus changes.)

FIG. 8C shows a view of what the wearer sees when looking through the birdbath optic at near objects with a change in the focus of the virtual images. Again, the wine bottle 801*c* and other objects in the foreground appear sharply in focus, and objects 805*c* in the background appear blurry or out of focus. In this case, however, the birdbath optic focus is selected to generate the information-bearing images 803*c* at near focus so that they also appear sharply in focus. This selection may be made by the user via an actuator on or coupled to the birdbath optic or a remote control, such as a smart phone, smart watch, or purpose-built device. The birdbath optic may also automatically adjust the focus in response to a signal from the display controller, possibly based on the information being displayed, or in response to detection of an anatomical cue, such as a change in pupil diameter absent a change in ambient light level.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making technology disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus comprising:

a display to emit light forming a virtual image apparent to a wearer of the apparatus;

a beam splitter, in optical communication with the display, to transmit the light emitted by the display;

a mirror, in optical communication with the display and the beam splitter, to reflect the light emitted by the display to the wearer via the beam splitter;

a dynamic focusing element, in optical communication with the beam splitter and the mirror, to change a focus of the virtual image; and a controller, operably coupled to the dynamic focusing element, to control the dynamic focusing element based on at least one of the virtual image, input from the wearer, or an accommodation of the wearer.

2. The apparatus of claim 1, wherein the dynamic focusing element is a tunable lens.

3. The apparatus of claim 2, wherein the tunable lens is an electro-active lens.

4. The apparatus of claim 3, wherein the electro-active lens comprises:

a first cylindrical electro-active lens element; and a second cylindrical electro-active lens element in optical series with the first cylindrical electro-active lens element.

5. The apparatus of claim 2, wherein the tunable lens is a liquid lens.

6. The apparatus of claim 1, wherein the display is configured to emit polarized light and wherein the beam splitter is a polarizing beam splitter configured to transmit the polarized light emitted by the display to the dynamic focusing element.

7. The apparatus of claim 1, further comprising:

a button or touch sensor, operably coupled to the controller, to receive the input from the wearer.

8. The apparatus of claim 1, further comprising:

an antenna, operably coupled to the controller, and configured to receive a wireless signal from an external device, the wireless signal causing the controller to change the focus of the virtual image.

9. The apparatus of claim 8, wherein the external device is at least one of a smart phone, a smart watch, or an external controller.

10. The apparatus of claim 1, wherein the controller is configured to bring the virtual image to near focus in response to sensing that virtual image is intended to be seen at near focus and to bring the virtual image to infinite focus in response to sensing that virtual image is intended to be seen at infinite focus.

11. The apparatus of claim 1, further comprising:

a sensor, operably coupled to the controller, to detect at least one of an ambient light level or an accommodation of the wearer.

12. The apparatus of claim 1, further comprising:

an accelerometer or a gyroscope, operably coupled to the controller, to detect an orientation of the head of the wearer, wherein the controller is configured to change the focus of the virtual image based on the orientation of the head of the wearer.

13. A method of displaying a virtual image to a wearer of an apparatus comprising a display, a dynamic focusing element, a beam splitter, and a mirror, the method comprising:

generating the virtual image with the display;

changing a focus of the virtual image based on at least one of the virtual image, input from the wearer, or an accommodation of the wearer;

transmitting the virtual image through the dynamic focusing element; and reflecting the virtual image to a wearer of the apparatus via the beam splitter and the mirror.

14. The method of claim 13, further comprising:

receiving the input from the wearer via a button or a touch sensor.

15. The method of claim 13, wherein changing the focus of the virtual image further comprises:

receiving a wireless signal from an external device; and changing the focus of the virtual image in response to the wireless signal.

16. The method of claim 13, wherein changing the focus of the virtual image comprises at least one of:

bringing the virtual image to near focus in response to sensing that the virtual image is intended to be seen at near focus; or bringing the virtual image to infinite focus in response to sensing that the virtual image is intended to be seen at infinite focus.

17. The method of claim 13, further comprising:

sensing, using a sensor, at least one of an ambient light level or an accommodation of the wearer.

18. The method of claim 13, wherein changing the focus of the virtual image further comprises:

sensing an orientation of the head of the wearer; and changing the focus of the virtual image in response to sensing the orientation of the head of the wearer.

19. The method of claim 13, wherein the dynamic focusing element comprises an electro-active lens and the electro-active lens comprises:

a first cylindrical electro-active lens element; and a second cylindrical electro-active lens element in optical series with the first cylindrical electro-active lens element and changing the focus of the virtual image comprises:

adjusting a focus of the first cylindrical electro-active lens element and/or adjusting a focus of the second cylindrical electro-active lens element.

* * * * *